United States Patent [19]
Parzych

[11] Patent Number: 6,115,384
[45] Date of Patent: Sep. 5, 2000

[54] GATEWAY ARCHITECTURE FOR DATA COMMUNICATION BANDWIDTH-CONSTRAINED AND CHARGE-BY-USE NETWORKS

[75] Inventor: Matthew J. Parzych, San Francisco, Calif.

[73] Assignee: Fourelle Systems, Inc, Santa Clara, Calif.

[21] Appl. No.: 08/667,002

[22] Filed: Jun. 20, 1996

[51] Int. Cl.[7] ............................. H04L 12/28; H04L 12/56
[52] U.S. Cl. ............................. 370/401; 370/466
[58] Field of Search ..................... 370/398, 465, 370/466, 467, 477, 401, 402, 351, 352–356, 395

[56] References Cited

U.S. PATENT DOCUMENTS

| | | | |
|---|---|---|---|
| 5,293,379 | 3/1994 | Carr | 370/477 |
| 5,307,413 | 4/1994 | Denzer | 370/477 |
| 5,446,736 | 8/1995 | Gleeson et al. | 370/230 |
| 5,535,199 | 7/1996 | Amri et al. | 370/392 |
| 5,627,829 | 5/1997 | Gleeson et al. | 370/230 |
| 5,633,891 | 5/1997 | Rebec et al. | 370/260 |
| 5,673,322 | 9/1997 | Pepe et al. | 395/762 |

*Primary Examiner*—Ajit Patel
*Attorney, Agent, or Firm*—Michael A. Glenn

[57] ABSTRACT

A gateway architecture for data communication over bandwidth-constrained and charge-by-use networks (10) uses a C_Gate application (14) located between a client application (12) and a bandwidth-constrained network (22), and an S_Gate application (20) located between the bandwidth-constrained network (22) and an Internet server (26), to send and receive data in an efficient manner across the bandwidth-constrained network (22) by converting the native protocols of the client application (12) and the Internet server (26) to a bandwidth-efficient protocol. The C_Gate application (14) and S_Gate application (20) also act to reconvert data packets from the bandwidth-efficient protocol back to the native transport protocols for data communication to the Internet server (26) and the client application (12).

20 Claims, 3 Drawing Sheets

GATEWAY ARCHITECTURE FOR DATA COMMUNICATION BANDWIDTH-CONSTRAINED AND CHARGE-BY-USE NETWORKS

FIELD OF THE INVENTION

The invention relates to data communications networks. More particularly, the invention provides an electronic network-based gateway architecture and methodology for reducing or minimizing data transmission over bandwidth-constrained portions of a data communications network (hereafter referred to as "R_Link".

BACKGROUND OF THE INVENTION

During the last three years there has been exponential growth in the availability of information from and use of data communications networks. Users of the Internet, intranets, enterprise networks and other data communications networks are able to make travel reservations, query bank accounts, access corporate databases, obtain stock quotes, send and receive e-mail, purchase wine, etc., from almost anywhere in the world, as long as they have the ability to connect to these networks from a local access point.

Much of the referenced growth can be attributed to the development of World Wide Web (WWW) browsers such as NCSA's Mosaic and Netscape's Navigator, which have given a graphical user interface to the formerly text-based networks, and on the widespread acceptance of the TCP/IP protocols that these Web Browsers utilize. By 1998, it is estimated that as many as 70% of all computers worldwide will use the TCP/IP protocols as a standard for data communications.

As the number of users who access data communication networks has increased, so has the volume of information transferred increased. In addition, as modem speeds have increased, the demand for more "content" has increased. There is a general trend that with information delivery, "more is better." As a result of these trends, the average user is now able to send and receive audio, video and voice across the typical data communications network.

As users and technology push the boundaries of the networks, limitations and limiting factors evolve or play a greater role in application development. One limitation of any data communication network is the size of its "pipe". That is, how much data can be transmitted across a network at any given time. The concept of a "pipe" can be compared to amperage flowing through an electric circuit or water flowing through a garden hose.

All data pipes, no matter how large, have limitations related to throughput. This concept can be thought of as bandwidth-constrained. Historically, the capacities of available data pipes have not been an issue in the use of the networks. However, as the number of users has increased and the amount of data those users are transmitting has increased, the capacities of the pipes has become a topic of discussion. Most of the discussions have centered on wireline or wired data communications networks. Some portions of those pipes are becoming bandwidth-constrained, and future uses of new technology may pose additional limitations. An example of a type of bandwidth-constrained or R_Link wired network is the uplink side of some cable networks.

During the same period of time that the explosion in users occurred on wireline networks, the development of wireless networks was accelerating in pace. The ability to deliver lower cost "anytime, anywhere" access to wireless data communications users became a reality on the drawing board and as a result, service providers who could deliver this type of access began or increased deployments. Generally, due to speed and throughput, wireless networks are thought of as bandwidth-constrained. Examples of bandwidth-constrained or R_Link wireless networks include circuit-switched cellular, CDPD, SMR, ESMR, packet radio, satellite, etc.

Other important factors in the deployment of wireless data access is the development of handheld, mobile and portable devices such as laptop computers, PDAs, two-way pagers, small form-factor wireless data modems and data-ready cellular phones. It is clear the future of data communications includes access from anywhere using wireless data networks. More so with wireless networks than wireline networks, capacities and throughputs pose serious limitations on the applications and users of these networks.

Although the applications and wired/wireless devices that exist today can be used together to access the data networks described earlier, they can be both prohibitively costly and unacceptably slow. Most existing applications and protocols have been designed for use over high-speed, high-bandwidth networks and as a result are not bandwidth-efficient when operated over lower-speed, lower-bandwidth wide area data networks (wireless or not). The applications and their native protocols (e.g. a Web browser using HTTP) have inherent limitations due to access speed, bandwidth, number of users, the protocol itself, etc. However, their widespread use makes it unlikely that a change in the design of the application to use a more efficient protocol, will take place anytime soon.

What is needed is a methodology that effectively unites these two worlds. Previous inventions provided basic links between wireless users and fixed wired networks, and some addressed differences in protocols between the two. But, none allowed the use of existing applications and their protocols that are efficient in high-speed, high-bandwidth portions of a data communications network (hereafter referred to as "NR_Link"), in R_Link portions where native functionality is maintained and efficiency and throughput are improved.

C. Perkins, *Network Address Management for a Wired Network Supporting Wireless Communication to a Plurality of Mobile Users; for Transmitting Information*, U.S. Pat. No. 5,159,592 (Oct. 27, 1992) discloses a local gateway coupled between a wireless LAN and the wired network for communication with a mobile communication unit.

C. Perkins and J. Rekter, *Shortcut Network Layer Routing for Mobile Hosts*, U.S. Pat. No. 5,442,633 (Aug. 15, 1995) disclose the routing of packets between mobile and fixed hosts which are coupled to a network. The disclosed method includes the transmission of packets "from the mobile host to a second, destination host on the network through a wireless link that is established between the mobile host and a base access station that serves a current physical location of the mobile host." Packets originating from the mobile host arrive at the fixed host with an "Internet Protocol Loose Source Routing" option that includes a network address of the base access station. While this methodology makes a network connection between the mobile host and fixed host, it fails to minimize the amount and size of packets sent and received by the mobile host over the wireless link.

J. Hart, *System for Expanding Network Resources to Remote Networks*, U.S. Pat. No. 5,423,002 (Jun. 6, 1995) discloses a system for interconnecting networks, wherein "a routing adapter extends a remote routing interface of the boundary router transparently across the communication link" to a second network.

R. Bird, K. Britton, T. Chung, A. Edwards, J. Mathew, D. Posefsky, S. Sarkar, R. Turner, W. Chung, Y. Yeung, J. Gray, H. Dykeman, W. Doeringer, J. Auerbach, and J. Wilson, *Compensation for Mismatched Transport Protocols in a Data Communications Network*, U.S. Pat. No. 5,224,098 (Jun. 29, 1993) disclose a transport layer protocol boundary architecture, in which transport functions are compared and compensated for between a first application program and a second remote application. If compensations are necessary, de-compensation operations can be performed before the data is delivered to the remote application program.

The prior art thus provides basic connections between wireless devices and fixed networks and hosts, and addresses protocol differences, but does not provide a methodology for reducing or minimizing data transmission over the bandwidth-constrained portions of a data communications network (R_Link). The development of a cost-effective and efficient data communications system and methodology between wireless devices and network-based information and services would constitute a major technological advance.

SUMMARY OF THE INVENTION

The invention provides a gateway architecture for data communication over bandwidth-constrained and charge-by-use portions of networks (R_Links) that overcomes the problems encountered by prior art mobile computing protocol networks. The immediate implementation and examples used throughout the document use a wireless data network at the R_Link but as identified in the Background of Invention, the R_Link is a bandwidth-constrained portion of the network, wireless or not. The invention includes an application located between a client application and an R_Link (C_Gate), and an application located between the bandwidth-constrained network and a network host (S_Gate). Both C_Gate and S_Gate send and receive data in an efficient manner across the R_Link by converting the native protocols of the client application or network host to a bandwidth-efficient protocol. Both C_Gate and S_Gate also reconvert data packets from the bandwidth-efficient protocol to the native protocols for data communication to the network host or client application.

C_Gate and S_Gate work in conjunction with a client application running on a mobile computer and with a network host, respectively, and serve to form a Dual-Proxy Gateway combination.

References to "client" and "server" in describing the invention are descriptive and an implementer should note that the invention may be used in, but not limited to, host-to-host or peer-to-peer environments as well as other environments.

DETAILED DESCRIPTION OF A PREFERRED EMBODIMENT

Figure 1:
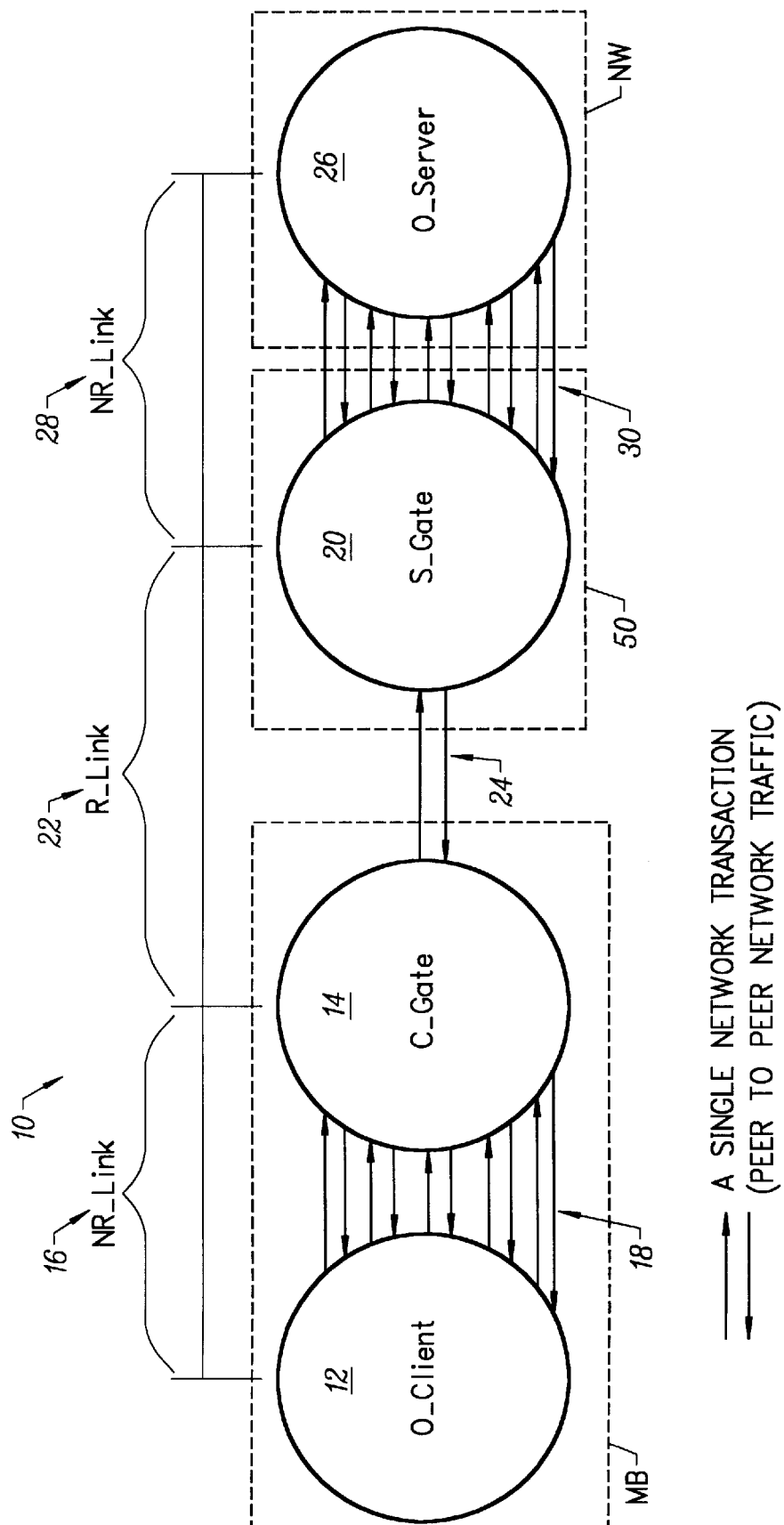
FIG. 1 is a functional block diagram which illustrates the structure of the Dual-Proxy Gateway for data communication between mobile devices and network hosts, using proxy applications (C_Gate and S_Gate) on each side of the R_Link and a bandwidth-efficient protocol across the R_Link.
Figure 2:
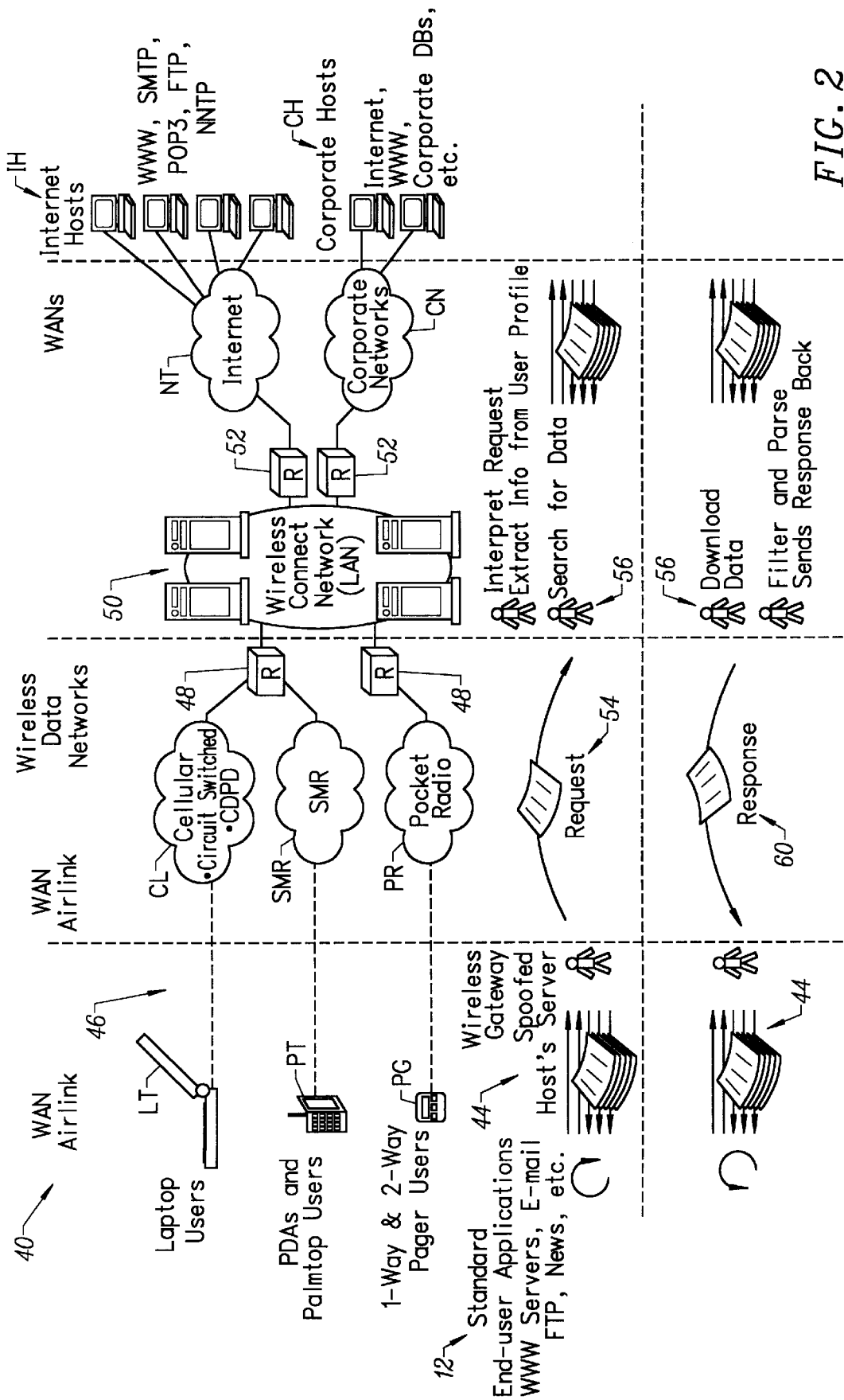
FIG. 2 is a functional block diagram which illustrates the implementation of the gateway architecture for data communication between mobile devices and network hosts, using intelligent agents and gateway architecture to maximize network efficiency.

FIG. 1 is a block diagram depicting the structure of the Dual-Proxy Gateway architecture for data communication over bandwidth-constrained and charge-by-use networks 10. This illustration shows how the invention provides an Internet Protocol-based gateway architecture that reduces or minimizes data transmission over R_Link (commonly referred to as "network bottlenecks"). The gateway architecture also applies to a network where users are charged on a per-packet or a per-byte basis for communication over certain or all links. These particular networks links are also referred to as R_Links 22. All other network links that cannot be labeled R_Links 22 are referred to as NR_Links 16, 28.

Users and network providers using the gateway architecture 10 can realize both better throughput and reduced or minimal packet overhead when running existing Internet Protocol-based (IP) applications over R_Links 22, without sacrificing functionality.

Most of today's IP-based applications (e.g. SMTP, POP3, HTTP, FTP, NNTP, Telnet) were designed to use the Transmission Control Protocol (TCP) over relatively high-speed, high-bandwidth networks. However, due to both the connection-oriented nature of this transport protocol and the inefficiencies associated with various Internet applications, the use of such applications over R_Links 22 is often prohibitively expensive and unacceptably slow. An alternative to redesigning and redeveloping existing applications to operate in a network with R_Links 22 is to utilize a gateway architecture that reduces or minimizes data transmission over the R_Links 22.

Gateway Operation

The gateway architecture for data communication 10 consists of four key applications, or logical network nodes, two of which are the original client and server applications (hereafter referred to as O_Client 12 and O_Server 26, respectively) and two new applications; one which runs on a node on the O_Client side of the R_Link 22 (hereafter referred to as C_Gate 14) and another which runs on a node on the O_Server side of the R_Link 22 (hereafter referred to as S_Gate 20).

References to an "application" are not meant to imply these programs necessarily execute at either OSI's Layer 7 (Application Layer) or on top of TCP. However, references to both the O_Client 12 and O_Server 26 applications running in an Internet-based environment does imply programs running at the traditional application level.

Operation of the gateway in combination with descriptions of the interactions between the four key applications 12, 14, 20, and 26 is outlined below.

Spoofing the O_Client Application

O_Client 12 needs to be "spoofed" (fooled) into thinking the server with which it wants to communicate is situated in the network path prior to the R_Link 22.

Spoofing is accomplished by changing all of O_Client's references or links to O_Server 26 to C_Gate 14, thereby making O_Client 12 believe it can obtain the information or services it seeks from C_Gate 14. Depending on O_Client 12's application design, this can be accomplished by re-configuring O_Client's setup parameters when the end user of O_Client explicitly specifies C_Gate 14 as the destination server at run time, or by dynamically changing references of C_Gate 14 from O_Server 26 to C_Gate 14 at run time. Except in the case of the latter, C_Gate 14 is preliminarily informed of the 0_Server's address for routing purposes. In all cases, C_Gate 14 will need to know the address(es) of the S_Gate node(s). This can be accomplished by hard-coding the software, providing a useR_configurable mechanism, or by providing some process that allows for dynamic configuration depending on the number of S_Gate nodes that are available.

C_Gate 14 responsibilities may include all or a subset of the following:

a) receiving requests and gathering information from O_Client 12;

b) dynamically changing references from O_Server 26 to C_Gate 14 at run time;

c) sending and receiving messages to and from S_Gate 20 using bandwidth-efficient protocols;

d) understanding the application protocols of the O_Client 12 and O_Servers 26 it will be serving;

e) compression;

f) encryption;

g) caching; and h) others. C_Gate 14 knows the application protocol associated with O_Client 12 and O_Servers 26, but is not a full functioning O_Server 26. Instead, after receiving certain types of application protocol data units (PDUs) from O_Client 12, C_Gate 14 may need to send a response back to O_Client 12 immediately in order to spoof it into believing it is communicating with O_Server 26. However, at certain points during the transaction process, when the information O_Client 12 requests is not available to C_Gate 14 and C_Gate 14 is unable to spoof a response, C_Gate 14 must send a request to S_Gate 20 to obtain the requested information. This request is transmitted to S_Gate 20 using bandwidth-efficient protocols. The request may consist of the actual O_Client request 46, a subset of the O_Client request 46, or a collection of data gathered from numerous O_Client requests 46.

Responses may contain all the information C_Gate 14 needs to transmit back to O_Client 12 or a subset of the information. In the former case, C_Gate 14 extracts the user data from the response and returns it to O_Client 12 using the native protocol(s). C_Gate 14 massages the data, encapsulates the user data in the appropriate application header, and transmits a response to O_Client 12.

Transaction Handoff Across R_Link

There is a relay, or transaction hand-off, in which case an application on the client side of the R_Link 22 hands off the responsibility of performing a specific transaction to an application on the other side of the R_Link 22 in an efficient manner. Handoff efficiency is attained because the amount of data transmitted to complete the transaction is reduced without sacrificing functionality.

The goal is to provide a sufficient, but reduced or minimized amount of data to S-Gate running on the O_Server 26 side of the R_Link 22 that allows it to act as a proxy for O_Client 12. C_Gate 14 sends only the unique and necessary application protocol information, or a compressed version of the application protocol information, required by S_Gate 20 to act as a proxy on behalf of O_Client 12.

S_Gate responsibilities may include all or a subset of the following:

a) receiving and processing requests 46 from C_Gate 14;

b) reformulating original O_Client requests 46 based on information received from C_Gate 14;

c) sending and receiving messages to and from O_Server 26 using the native protocol(s) of O_Client 12 and O_Server 26;

d) understanding the application protocols of O_Client 12 and O_Servers 26 it is serving;

e) compression;

f) encryption;

g) caching the responses from O_Server 58 destined for the C_Gate 14;

h) using bandwidth-efficient protocols to communicate with C_Gate 14; and

I) others.

S_Gate 20 knows the application protocol associated with the O_Client 12 and O_Servers 26, but is not a full functioning O_Client 12. Instead, after receiving a request from C_Gate 14 on O-Client's behalf, S_Gate 20 sends a request or set of requests 54 to O_Server 26 and waits for a reply or set of replies. It does not have to consider how to display the response 58 or take user input directly —that remains the responsibility of O_Client 12. In this role, S_Gate 20 is acting as a proxy for O_Client 12 for sending requests 54 but as a relay, or pipe, regarding responses 58.

Internet HTTP Request Without Invention

The following are the steps a wireless mobile user must complete today to download stock information from an Internet Host IH on the World Wide Web (WWW) using a standard Web browser, laptop computer equipped with TCP/IP software, and a wireless data modem. It is assumed that the user is already connected to a carrier's network that has Internet connectivity. It is also assumed the user knows the Universal Resource Locator (URL) of the stock quote service from which they will download the information. Recall that each packet, in addition to travelling across portions of the Internet that may not be bandwidth-constrained (NR_Links), must travel across the bandwidth-constrained wireless link (R_). The description includes the fewest number of transactions required to complete the request. Depending on a network's load, this number may increase.

In the prior art the following occurs:

1) The user starts the TCP/IP software and Web browser software, types in the stock server's URL and presses <Enter>. A packet is sent over the airlink to a domain server that resolves the host's name (e.g. www.pcquote, com) to an IP address. The response is sent back over the airlink (2 packets);

2) The TCP/IP software begins a three-way handshake with the host machine to establish the end-to-end network connection (3 packets);

3) The Web browser sends a GET request directed at the host machine, requesting the download of the page needed to fill-in the desired stock ticker symbol information. The host responds by initially sending an acknowledgment back (2 packets);

4) The host sends back the requested text page (a form), which is, in turn, acknowledged by the user's TCP/IP software (2 packets); and 5) The logical connection is torn down requiring, at a minimum, another three-way handshake by the peer applications (3 packets).

The last four steps are repeated for each graphic that exists in the Web page. For this example, it is assumed that the user has opted not to download in-line graphics to save money (assuming a pay-by-use network) and time.

6) The user fills in the desired stock tickers and clicks the form's Submit button;
7) The TCP/IP software begins a three-way handshake with the host machine to establish the logical network connection (3 packets);
8) The Web browser sends a POST request directed at a CGI program on the host machine, sending HTTP protocol information, the form's parameters and list of stock ticker symbols. The host sends an acknowledgement back (2 packets);
9) The host looks up the requested stock data and sends back a text response which is, in turn, acknowledged by the wireless mobile user's TCP/IP software. The stock information is displayed by the Web browser (2 packets); and
10) The logical connection is torn down requiring, at a minimum, another three-way handshake by the peer applications (3 packets).

In the previous scenario, without using the invention, there have been at minimum 22 packets sent across the network path. The byte count typically ranges from 3,000 to 20,000, depending on the quote information requested and whether or not graphics are downloaded. If graphics are not downloaded, this process takes approximately 30 seconds.

By comparison, using the invention, the user is only charged for 4 packets, a byte count ranging from 150 to 500 bytes, and the transaction takes approximately ten seconds.

Internet HTTP Rrequest With Invention

The following are the steps a wireless mobile user must complete when requesting the same information as described above, only in this scenario, the invention will be implemented and the resulting transaction differences are apparent. The same assumptions as defined in the previous example are used in this one.

1) The user starts the TCP/IP software and Web browser software, types in the stock server's URL and presses <Enter>. In this case, the Web browser (O_Client) is "spoofed" into thinking it is communicating with a local "Web host" residing on the laptop computer. This local Web host is the C_Gate application. Any packet transactions that occur between O_Client and C_Gate are considered "NR_Link" transactions. (0 packets)

Note: In outbound transactions, C_Gate is a program that intercepts and interprets the Web browser's native protocols GET and POST commands, determines what type of data the end user is trying to obtain, and generates a single packet using a bandwidth-efficient protocol, which it sends across the R_Link to another program that reforumulates the information into the native protocols (S_Gate). In this case, an end-to-end connection between C_Gate and S_Gate is not established because the optimized transport protocol is a "connectionless" protocol (e.g., UDP), whereas the non-optimized transport protocol used by the Web browser is a "connection-oriented" protocol (e.g., TCP).

2) C_Gate massages, compresses, etc. the original O_Client request(s) and sends the requested information across the R_Link to S_Gate using the optimized bandwidth-efficient protocol. (1 packet)
3) Upon receiving the packet from C_Gate, S_Gate reformulates the original O_Client request and transmits it to the specified stock quote host using the native protocols of the Web browser, at which point, the following transactions occur between S_Gate and the stock quote host machine (O_Server) across the NR_Link:

a) A packet is sent to O_Server that resolves the host's name (e.g. www.pcquote.com) to an IP address. The response is sent back to S_Gate.
b) A GET request to download the page needed to fill-in the desired stock ticker symbol is sent to O_Server and acknowledged by O_Server.
c) The text page (form) is sent back to S_Gate and S_Gate acknowledges that to O_Server.
d) The connection between S_Gate and O_Server is terminated.

All transactions that occur between S_Gate and O_Server due to the original O_Client request are processed at this time across an NR_Link. (0 packets)

4) S_Gate reformulates the O_Server information and sends it across the R_Link to C_Gate using bandwidth-efficient protocols. (1 packet)
5) C_Gate reformulates the information received from S_Gate into the native protocols of the Web browser and delivers it across an NR_Link to O_Client, where it is acknowledged by the TCP/IP software and displayed by the Web browser. (0 packets)
6) The connection between the C-Gate and O_Client is disconnected. (0 packets)

At this point, the user has the requested page on his Web browser and the total R_Link packets transmitted is two. The user can then enter the desired stock ticker symbols and click on the form's Submit button.

7) The same process that occurred in the prior five steps is repeated, resulting in two more packets that transmit across the R_Link. The requested stock information is displayed on the user's Web browser.

In the previous scenario, using the invention, there have been 4 packets sent across the pay-by-use portion (R_Link) of the network. The byte count for the R_portion typically ranges from 150 to 500, and the process takes approximately ten seconds.

Summary of Disclosed Gateway Architecture Using HTTP

14–23 The invention provides an efficient methodology for obtaining information on demand over a wireless wide area network, using the gateway architecture for data communication over bandwidth-constrained and charge-by-use portions of data communications networks 10.

In addition to functionality described in the previous example, it is possible to further optimize the HTTP scenario when it is known in advance the format of the data and/or the significance (to the end-user) of the data that is returned in an HTTP response. Examples of how this type of optimization may occur follows:

1) Application data protocols that allow the end user data to be transferred (I.e., non-HTML) from S_Gate to C_Gate can be defined. In this case, C_Gate detects an HTTP response from a particular source and knows in advance the format of the user data being returned. C_Gate can place that data into a predefined HTML template file before transmitting it to O_Client for display. The pre-defined HTML templates are stored in the C_Gate cache memory.
2) User profiles can reside on S_Gate that define HTTP response filtering schemes, maximum data size limitations, portfolio values, etc., all of which can be used to reduce or minimize the amount of data required to complete a transaction. For example, instead of the stock query scenario described earlier, a user could have a portfolio of stock ticker symbols and other related values residing on S_Gate. In the previous example, the four R_Link transactions required to request/download the stock query form and to submit the user's input/obtain the stock information can be replaced by two R_Link transactions, one which includes a request to obtain stock information based on portfolio values located on S_Gate and a second that provides a customized response to the request.

Figure 3:
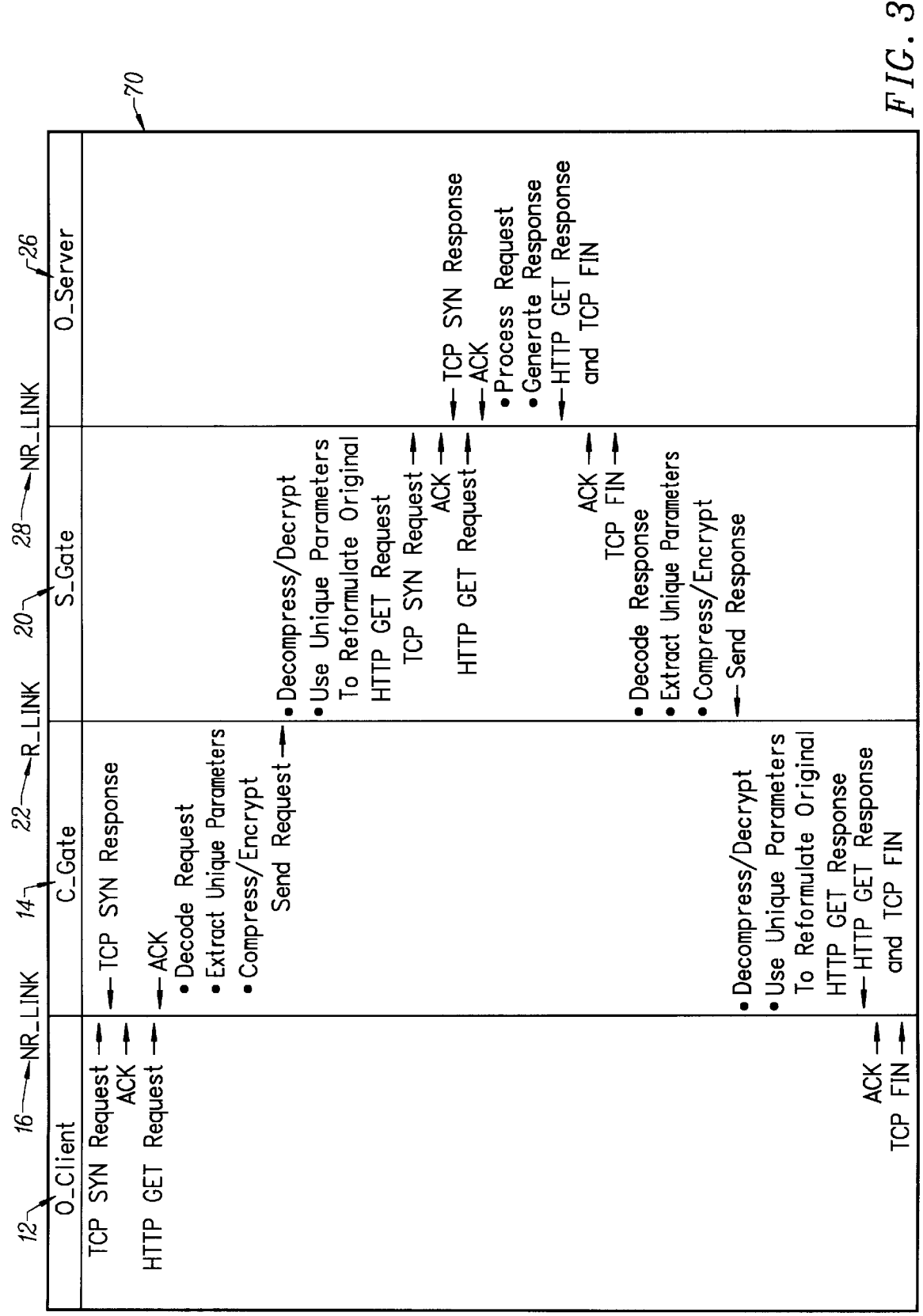
FIG. 3 is an example of a communication session over the Dual-Proxy Gateway architecture using the HTTP protocol.

Diagrams of the disclosed gateway architecture using the Web browser's HTTP protocol are shown in FIG. 3. In the figure, the first example and two additional ones provided above are shown with arrows adjacent to link boundaries representing packet exchanges.

Although the gateway architecture for data communication over bandwidth-constrained and charge-by-use networks is described herein in connection with an Internet-based gateway architecture between wireless devices and Internet-based information and services, the invention may be applied to any of a wide variety of network protocol applications, as desired.

Although the present invention has been described in detail with reference to a particular preferred embodiment, persons possessing ordinary skill in the art which this invention pertains will appreciate that various modifications and enhancements may be made without departing from the spirit and scope of the claims that follow.

What is claimed is:

1. A method for effecting data communications between a remote node and a host, comprising the steps of:

exchanging data in a first exchanging step between a client application at said remote node using the TCP/IP communications protocol which is resident on said remote node and a first proxy or gateway, wherein said first exchanging step further comprises the step of compressing said data;

converting said TCP/IP communications protocol resident on said remote node into a bandwidth-efficient protocol prior to transmission of said data communications from said first proxy or gateway to said host;

reconverting said bandwidth-efficient protocol back to said TCP/IP communications protocol at a second proxy or gateway; and exchanging data in a second exchanging step between said second proxy or gateway and an application at said host in said TCP/IP communications protocol which is resident on said host, wherein said second exchanging step further comprises the step of decompressing said data.

2. The method of claim 1, wherein said host is an Internet.

3. The method of claim 1, wherein said host is an intranet.

4. The method of claim 1, wherein said standard communications protocol is Transmission Control Protocol/Internet Protocol.

5. The method of claim 1, wherein the step of reconverting said bandwidth-efficient protocol back to said standard communications protocol further comprises the step of interpreting data communications.

6. A gateway architecture for data communication over network between a remote node and a host, comprising:

a first proxy or gateway located between a client application and said network, wherein said first proxy or gateway receives requests and gathers information from said client application using the TCP/IP communications protocol which is resident on said remote node, and wherein said information is first compressed and then converted to a bandwidth-efficient protocol prior to communication over said network; and a second proxy or gateway located between said network and said host, wherein said second proxy or gateway receives requests from said first proxy or gateway, and wherein said second proxy or gateway sends and receives messages to and from said host in said TCP/IP communications protocol resident on said host, wherein said information is first reconverted from said bandwidth-efficient protocol back to said TCP/IP protocol and then decompressed after receipt over said network;

wherein said first proxy or gateway sends and receives messages to and from said second proxy or gateway over said network using an efficient transport mechanism other than TCP/IP.

7. The gateway architecture of claim 6, wherein said client application operates as though said server is located between said client application and said bandwidth-constrained network.

8. The gateway architecture of claim 6, wherein said first proxy or gateway extracts data from said requests and said information from said client application.

9. The gateway architecture of claim 6, wherein said second proxy or gateway stores information regarding said client application.

10. The gateway architecture of claim 9, wherein said second proxy or gateway combines said information regarding said client application with said requests.

11. A method for effecting data communications between a host and a remote node, comprising the steps of:

converting the TCP/IP communications protocol which is resident on said host into a bandwidth-efficient protocol with a first proxy or gateway prior to transmission over a network to said remote node, wherein data for said data communication are compressed prior to said converting step; and reconverting said bandwidth-efficient protocol back to said TCP/IP communications protocol with a second proxy or gateway at said remote node, wherein said data for said data communication are decompressed after said reconverting step.

12. The method of claim 10, wherein said network is an Internet.

13. The method of claim 10, wherein said network is an intranet.

14. The method of claim 10, wherein said standard communications protocol is Transmission Control Protocol/Internet Protocol.

15. The method of claim 10, further comprising the step of:

reconverting said bandwidth-efficient protocol back to said standard communications protocol; and interpreting data communications.

16. A gateway architecture for data communication over a network between a remote node and a host, comprising:

a client application located on said remote node, said client application using the tCP/IP protocol;

a first proxy or gateway located between said client application and said network, wherein said first proxy or gateway converts said TCP/IP protocol of said client application to a bandwidth-efficient protocol for data communication over said network, wherein data for said data communication are compressed prior to said conversion; and a second proxy or gateway located between said network and said host, wherein said second proxy or gateway reconverts said bandwidth-efficient protocol back to said TCP/IP protocol for data communication to said host, wherein said data for said data communication are decompressed after said reconversion.

17. The gateway architecture of claim 16, wherein said client application operates as though said host is located between said client application and said network.

18. The gateway architecture of claim 16, wherein said first proxy or gateway intercepts data before data communication occurs from said client application to said host over said network.

19. The gateway architecture of claim 16, wherein said second proxy or gateway stores information regarding said client application.

20. The gateway architecture of claim 19, wherein said second proxy or gateway combines said information regarding said client application with said data communication between said client application and said host.

* * * * *